Feb. 8, 1949.  E. E. HABIB ET AL  2,461,271

METHOD OF MANUFACTURING BALLOONS

Original Filed Feb. 19, 1946

INVENTOR.
Emile E. Habib
David G. Greenlie
BY Theodore C. Browne
Attorney

Patented Feb. 8, 1949

2,461,271

UNITED STATES PATENT OFFICE 2,461,271

METHOD OF MANUFACTURING BALLOONS

Emile E. Habib, Belmont, and David G. Greenlie, Wayland, Mass., assignors to Dewey and Almy Chemical Company, North Cambridge, Mass., a corporation of Massachusetts Original Application February 19, 1946, Serial No. 648,674. Divided and this application August 6, 1947, Serial No. 766,742
In Canada January 25, 1947

2 Claims. (Cl. 18—58.7)

This invention relates to the manufacture of hollow inflatable objects and is particularly adapted to the manufacture of meteorological balloons of medium and large size. These balloons must fit standardized inflation equipment. It is essential, therefore, that the balloons have standardized neck diameters to fit the inflating apparatus which exists in the field.

Recently, there has been a need for meteorological balloons having inflated diameters at 760 mm., of approximately 8 feet and even larger. If balloons of such size are manufactured by gel inflation techniques, e. g., by that process disclosed in the patent to Habib and Gott No. 2,378,702, dated June 19, 1945, and if the neck diameter of the larger mold required to make these large balloons is held to the size already accepted as standard for the smaller ones, it will be found that the necks of the large balloons are weakly attached to the balloon envelope and tear out of the envelope when any heavy wind strain is imposed.

The present invention permits the manufacture of meteorological balloons having necks which are so securely attached to the balloon envelope that they will withstand any strain that the balloon envelope proper will take. In addition, the invention makes it possible to make a balloon having a substantial body diameter yet possess a much smaller diameter neck than any which has heretofore been possible.

We have discovered that if a mold is provided which will form an intermediate section of gel between the body and the neck which possesses a considerably greater diameter than the neck itself, that when the gel is inflated, the intermediate portion will be drawn into the lower hemisphere of the balloon envelope. But this new portion of the hemisphere will taper from the full thickness of the neck where it joins the neck to its juncture with the envelope where it has only the thickness of the envelope.

Additionally, the diameter of this tapered zone is directly related to the original diameter and length of the intermediate section and to the degree of inflation.

It is customary in the manufacture of meteorological balloons to form the balloon envelope by dipping a fluted mold into an aqueous dispersion of rubber. A fluted mold is much more compact and weighs much less than a non-fluted spherical mold, yet the lunettes of gel expand very smoothly into a spherical shape when the gel is enlarged in area. By far the simplest method of expanding a gel is to blow air into the hollow gel form, but other methods of gel expansion such as liquid pressure, stretching by pulling, or exhausting the air in the surrounding space are not excluded.

The invention may be more readily understood by reference to the drawings, in which Figure 1 is an elevation of the preferred form of the dipping mold;

Figure 1:
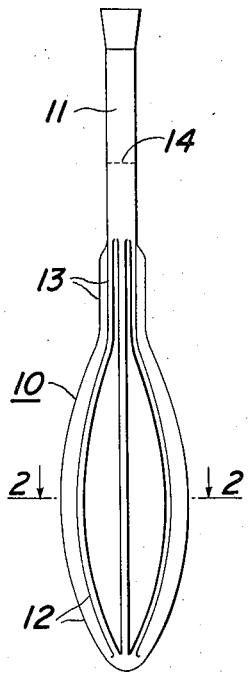
Figure 2:
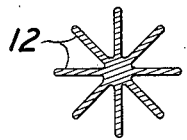
Figure 2 is a transverse section taken on the line 2—2 of Figure 1.

Referring to Figure 1, the mold 10 is preferably formed with a shank portion 11, and a body or flute portion 12. Intermediate the flute portion 12 and the shank 11, the flutes lose their lunette form and extend parallel to the axis of the shank as shown at 13.

When following any accepted gel inflation technique, the mold 10 is dipped into an aqueous dispersion of rubber up to a line on the shank 11 which is indicated by the reference numeral 14. When a deposit of sufficient thickness has been formed, the mold is withdrawn and the rubber deposit, still in a plastic, gel stage, is stripped from the mold. The end of the neck portion 6 of the deposit is fitted over an inflation nozzle N, then a clamp or tape-tie is tied about the neck at the point 15. The gel is then inflated.

We have found that if the balloon is to be approximately spherical, the axial perimeter of the flutes including the portions 12 and 13 must equal approximately the transverse maximum perimeter, i. e., the perimeter of the section 2—2. When other shapes are required, this ratio of perimeters is no longer necessary.

Figure 3:
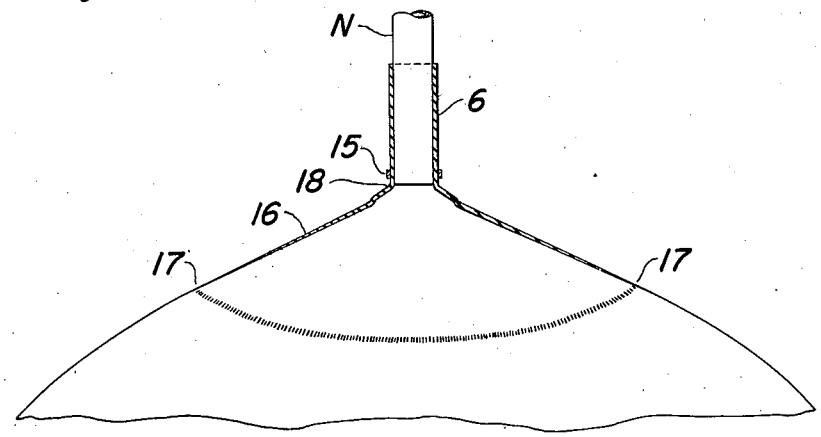
Figure 3 is a sectional elevation of a portion of an inflated balloon envelope.

As Figure 3 shows, the neck 6 of the gel remains the same diameter as the inflating nozzle but that portion 16 of the deposit which was formed on the parallel section 13 of the flutes, flares out into the body of the balloon with a generally tapering cross section which is thinnest where the portion 16 joins the body of the envelope, as indicated at 17, and thickest where the portion 16 joins the neck, as indicated at 18.

As an example, if an Army standard meteorological balloon is made on a fluted mold having a maximum perimeter of 34" around all flutes, a perimeter of 7.1" around the shank flutes, a shank 1.063" in diameter, and if the length of the fluted section parallel to the shank (13) is 3", then this balloon gel when inflated to 44" in diameter will have a thickness-tapered, reinforced zone surrounding the neck about 11" in diameter. The neck will be 1½" in diameter. Obviously, the size of this zone of reinforcement for the neck is determined by and may be varied by changes in the following factors:

(a) The length of the parallel section (13) of the flutes of the mold (b) By the perimeter of the same section, and (c) By the amount of the gel extension introduced by the gel-inflation step.

In order for the reinforcing section to taper smoothly from the balloon body to the neck, it is preferred to hold the ratio of the perimeter of the gel formed on the mold section 13 to the maximum perimeter of the gel formed on the flutes 12 to approximately 6:1 or less. If the difference in perimeters is much greater than 6:1, then for any given inflation pressure, the lunette sections 12 will expand practically to the exclusion of the reinforcing section 13. In this case, a thinning and weakening of the gel at the point 17 sometimes occurs. When the perimeters ratios are held approximately to the recommended limits, the intermediate section 13 is drawn smoothly into the body of the balloon.

Figure 4:
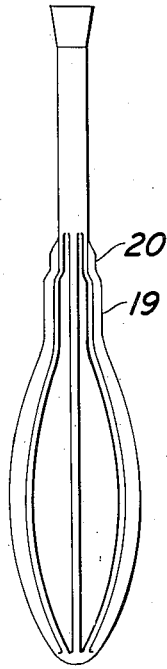
Figure 4 is an elevation of a modified form of balloon mold.

Figure 4 illustrates the shape of mold found useful when the balloon envelope must be large and the neck quite small. The first step 19 of the reinforcing zone has a perimeter which is one-sixth or a larger fraction of the maximum perimeter of the body portion of the gel. The second step 20 has a perimeter which in turn is one-sixth or a larger fraction of the perimeter of the gel formed on step 19. Obviously, as many steps as are necessary may be used to produce a smooth, tapered reinforcing flange between the body of the balloon and the neck. Two steps, however, will produce a finished balloon having an envelope diameter of 12 feet and a neck diameter of 2 inches.

The word "perimeter" as applied to fluted molds means the unfolded or developed distance progressively from root to apex of the convolutions around the form of the gel deposited upon the forming flutes as the sense requires.

The word "rubber" has been used to include natural rubber having the proper characteristics, for example, see Patent No. 2,378,700, chloro-butadiene-1,3 and the various artificial elastomers the gels of which possess sufficient strength to permit the requisite expansion.

For convenience in the specification and claims we have used the word "gel" to denote an undried, irreversible coagulum while that deposit contains a major proportion of its original aqueous constituent uniformly distributed in the rubber network.

This invention has been described as applied to meteorological balloons and fluted molds, but it is useful in the formation of any necked, hollow body and with molds of any construction. For example, spherical molds may be built according to this invention with a cylindrical intermediate flange-forming section interposed between the spherical body and the shank of the mold. Although the process is primarily adapted to the manufacture of hollow articles by the so-called coagulant dip process, it is useful in connection with cast as well as dipped rubber products.

Balloons produced by this invention have successfully met the requirements for small necks, large envelopes, and possess sufficient strength in the neck reinforcement to suspend meteorological apparatus in all normal weather conditions.

This application is a division of application Serial No. 648,674, filed February 19, 1946.

We claim:

1. The method for forming balloons and similar hollow objects having a neck reinforcing zone on the body of the balloon which consists in providing a hollow expansible gel having a stepped portion intermediate the body portion and the neck portion, that part of the intermediate portion adjacent the neck having a diameter greater than but not exceeding approximately 6 times the diameter of said neck and that part of the intermediate portion adjacent the body having a diameter less than but not less than one-sixth of the body portion of said gel, securing the neck portion of the gel against expansion throughout substantially the entire length thereof, expanding the gel by fluid pressure, and drawing the stepped portion of the gel beyond the neck portion into the body of said balloon by said expansion while retaining the molded neck diameter.

2. The method of forming balloons and similar hollow objects having a reinforcing zone on the body of the balloon which consists in providing a hollow expansible gel having a body portion, a neck portion and an intermediate portion between said body portion and said neck portion which is of greater diameter than said neck but not exceeding approximately 6 times the diameter of the neck portion and of lesser diameter than but not less than one-sixth of the diameter of said body portion, securing the neck portion of the gel against expansion throughout substantially the entire length thereof, expanding the gel in the body portion by fluid pressure and drawing the intermediate portion beyond the neck portion into the body of said balloon by said expansion to form a tapered reinforcing flange on the body of the balloon surrounding said neck while retaining the molded neck diameter.

EMILE E. HABIB.
DAVID G. GREENLIE.

REFERENCES CITED

The following references are of record in the file of this patent:

UNITED STATES PATENTS

| Number | Name | Date |
| --- | --- | --- |
| 2,236,306 | Bratring | Mar. 25, 1941 |
| 2,378,701 | Habib et al. | June 19, 1945 |
| 2,378,702 | Habib et al. | June 19, 1945 |

Certificate of Correction

Patent No. 2,461,271.　　　　　　　　　　　　　　　　　　　February 8, 1949.

EMILE E. HABIB ET AL.

It is hereby certified that errors appear in the printed specification of the above numbered patent requiring correction as follows:

Column 3, line 44, for the words "form of" read *form or*; column 4, line 13, for the year "1948" read *1946*;

and that the said Letters Patent should be read with these corrections therein that the same may conform to the record of the case in the Patent Office.

Signed and sealed this 27th day of September, A. D. 1949.

[SEAL]

THOMAS F. MURPHY,
*Assistant Commissioner of Patents.*